Figure 1:
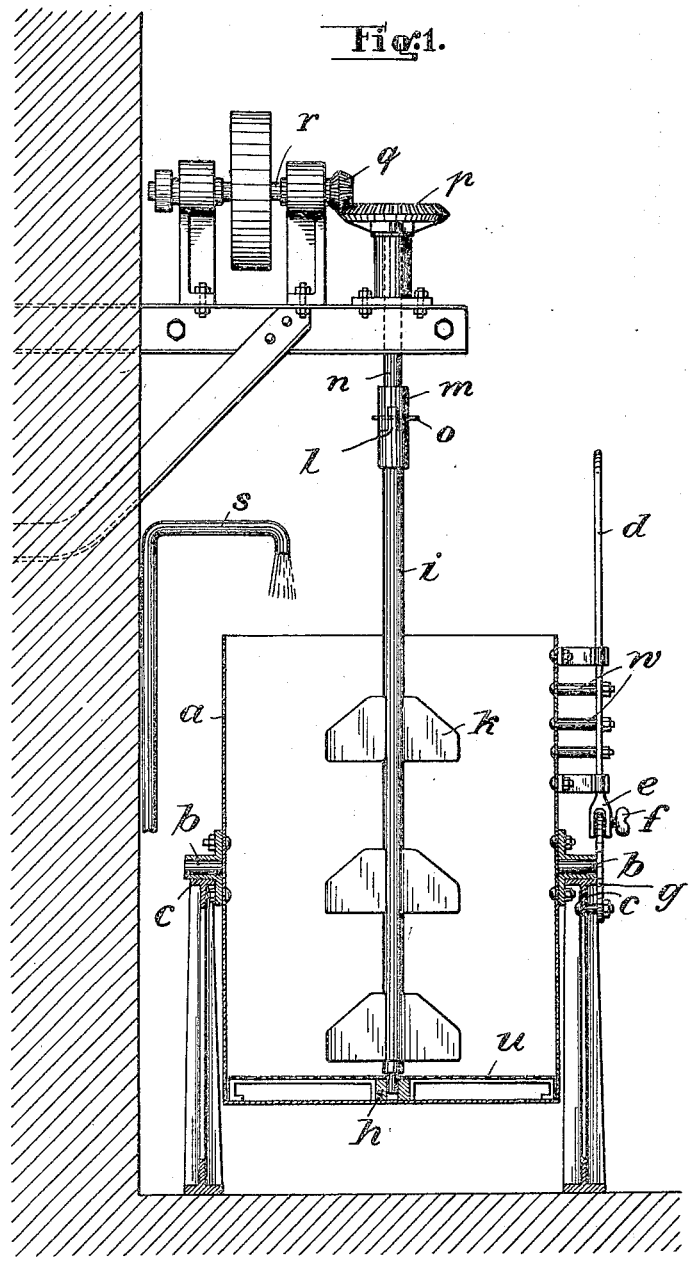

July 22, 1924.  1,502,409
R. SPEIDEL
DEVICE FOR NEUTRALIZING PICKLED NOURISHMENTS AND FODDER
Filed May 15, 1922    2 Sheets-Sheet 1

Inventor
ROBERT SPEIDEL
by Attorney.

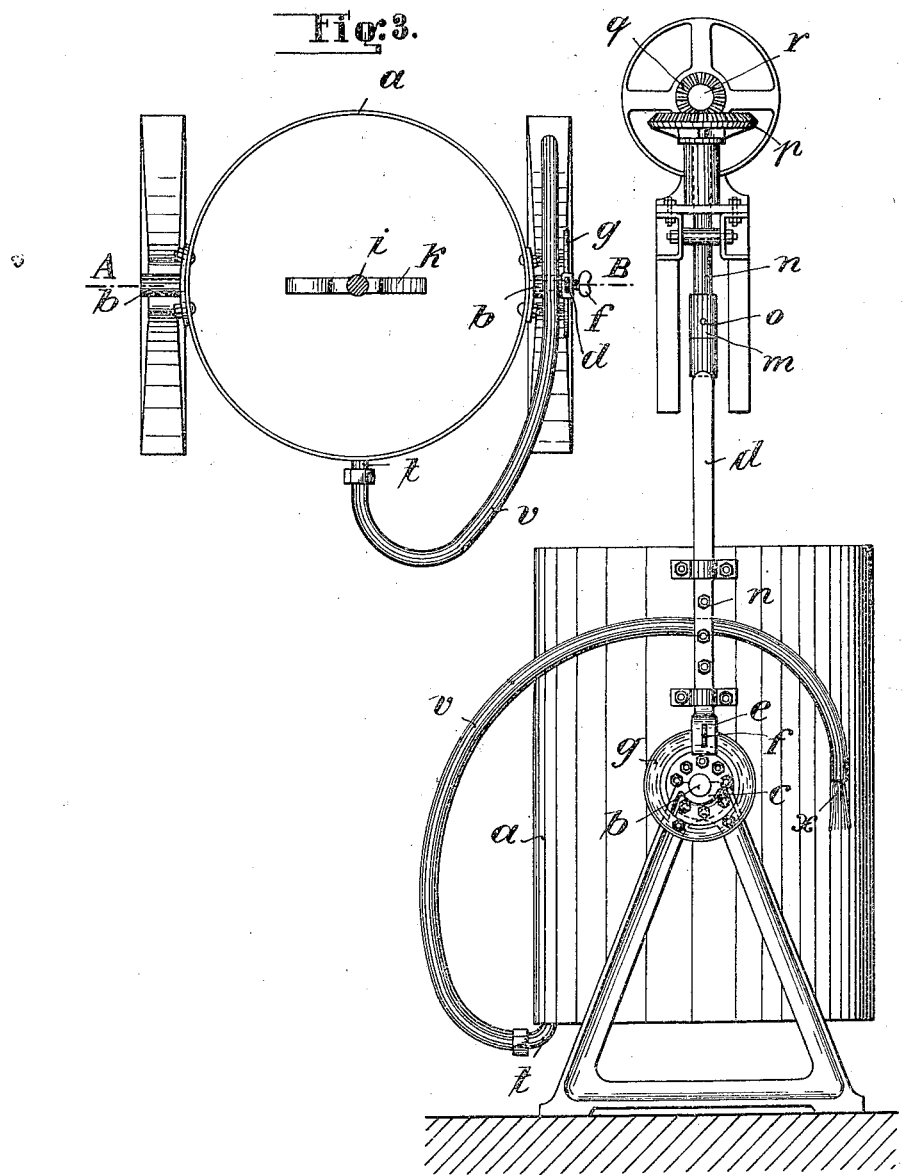

Patented July 22, 1924.

1,502,409

UNITED STATES PATENT OFFICE.

ROBERT SPEIDEL, OF CALMBACH, WILDBAD, GERMANY.

DEVICE FOR NEUTRALIZING PICKLED NOURISHMENTS AND FODDER.

Application filed May 15, 1922. Serial No. 561,075.

*To all whom it may concern:*

Be it known that I, ROBERT SPEIDEL, of German nationality, residing at Calmbach, Wildbad, Germany, have invented certain new and useful Improvements in and Relating to Devices for Neutralizing Pickled Nourishments and Fodder; and I do hereby declare the following to be a full, clear, and exact description of the invention, of which the following is a specification.

The complete neutralizing of large quantities of pickled meat, fish and the like has hitherto not been possible, and the processes which have become known up to the present are accompanied by a series of wants and disadvantages which shall be removed by the invention.

Meat, fish and the like which in order to preserve them had been strongly pickled were hitherto best neutralized by placing them into flowing water. In such case the goods were contained in receptacles which gave the water an easy access to the goods and which also allowed the water to quickly flow off again. The water in this case lixiviated the salt contained in the goods. This process had however the disadvantage that also in case of a long action of the water only the outer parts directly affected by the water became to a certain extent neutralized while those parts of the goods placed one on top of the other in the centre and depth, in other words the bulk of them remained un-neutralized, as the water was not able to act on these parts. The salt remaining within and near the middle part upon the goods being touched spread again over the neutralized parts so that the total mass practically kept its whole amount of salt. For certain goods, for instance, for such which are used for the manufacture of fish meal it is absolutely essential to remove the amount of salt contained as far as possible without at the same time allowing that losses of nutrition occur. The neutralizing could be achieved by exposing very small quantities to the influence of flowing water. The carrying out of such a process is, however, on the whole not possible in view of the large quantities which have to be handled. In many cases also the kind of the goods to be neutralized forbids the using of such a process. This process has still further the disadvantage that in case of a large content of salt the neutralizing will last from 24 to 48 hours and that already in case of a twenty-four hours treatment the goods in consequence of the lixiviation of albumen lose at least 10% of their nutrition. It has been ascertained from experiments that when treating large quantities of goods, the nutrition of the goods is considerably decreased in consequence of the treatment with water without the contents of salt being drawn off to the desired extent.

If the water used for the treatment is not of a low temperature, that is to say of about from 5–10 degrees, but of a higher temperature, the goods perish very easily after a treatment of a long duration.

All these disadvantages are according to the present invention removed by bringing the materials to be neutralized into a receptacle and after having filled the latter with water subjecting the materials to the action of an agitating device, during the agitating fresh water being admitted at the upper end while at the bottom end of the receptacle the salt containing water is let off.

With the aid of this process it is possible in about from $\frac{3}{4}$ of an hour up to 2 hours to carry through a thorough neutralizing of the goods without an appreciable loss of nutrition occurring. The latter does not quite amount to 1%. The new process makes it possible to use the strongly pickled offals of the fish industry and other pickled raw materials for the manufacture of fish meal. Heretofore the raw materials for the reasons mentioned in the aforegoing had to be worked up with a full content of salt, i. e., with about from 5–20%. The fodder obtained therefrom were, however, in consequence of its high contents of salt unsuitable for being fed out alone. They could only be used in very small quantities as an addition to the otherwise used fodder. It must be taken into consideration that for instance a pig can stand 3% of salt in the fodder only for a short period; longer feeding periods with fodder of the content of salt mentioned usually cause the death of the animal.

By means of the new process it is possible to neutralize in the shortest time in one working operation quantities of from 2000–3000 kg. of raw material according to the size of the receiving vessel, the quantity of water admitted and to the amount of power available.

Upon the accompanying drawings is illustrated one construction of a suitable device for carrying out the process, and it is:

Fig. 1 a vertical section along the line A—B of Fig. 3,

Fig. 2 a side view and

Fig. 3 a plan.

The device consists of a vessel $a$ which has preferably the shape of a vertical cylinder. The vessel has journals $b$ on the side with which it is resting in bearings $c$. The vessel can be swung about the journals $b$ by means of the hand lever $d$. The lever $d$ is fitted on its lower end with a fork $e$ which is provided with an adjusting screw $f$. The fork $e$ passes around a collar $g$ affected by the screw $f$. If with the aid of the hand lever $d$ the vessel $a$ has been swung about its journals $b$, it can be held in any desired inclined position with the aid of the adjusting screw $f$ and the collar $g$.

To the bottom of the vessel a bearing $h$ is fixed which receives the bottom journal of a shaft $i$ fitted with agitating wings $k$. The top end of the shaft $i$ is reduced and it is here gripped by the forked part $m$ of a shaft $n$ having the same axis as the shaft $i$. A pin $o$ serves to connect the two shafts $i$ and $n$ together. On the upper end of the shaft $n$ is mounted a conical wheel $p$, which is driven by a conical wheel $q$ fixed to the driving shaft $r$. The latter is driven by a motor or by a power transmission of any kind.

The driving of the shaft $i$ could of course be effected in another way, for instance by fixing an electric motor to the vessel $a$ which by means of an intermediate gear drives the shaft $i$.

Above the vessel $a$, a water pipe $s$ has been provided for, while at the bottom end a water offlet $t$ has been arranged. Above the water offlet $t$ is a sieve $u$ retaining the goods so that it cannot enter the water pipe. The sieve bottom $u$ is removable. To the water offlet $t$ a siphon pipe $v$ is connected. The siphon pipe may consist for instance of a rubber hose, a flexible metal pipe or of a rigid pipe being extensible and fitted with joints. For carrying the tube $v$ in the present mode of construction, a series of rods $w$ have been provided for. These rods enable a raising or lowering of the tube-mouth $x$. Obviously any other desired adjusting device can be employed for the intended purpose.

It is intended with the arrangement and adjustability of the siphon pipe to be able to adjust at will the height of the column of water effective at the place of outflow. The higher the place of the mouth $x$ is arranged, the less will be the pressure acting at the place of outflow and the smaller will be also the speed of the outflow and the total pressure of the water and of the goods to be handled on the sieve bottom $u$.

The process is carried out in the following manner:

After the vessel has been brought into the position shown in Fig. 1, it is filled with the material to be handled. Water is then admitted by opening the conduit $s$. As soon as the water has filled the remaining hollow spaces and has risen nearly up to the rim, the shaft $i$ with the agitating wings $k$ is set in motion. The salt containing water flows through the outlet $t$, the tube $v$ and mouth $x$. It will be observed that at first a turbid liquid containing a great amount of salt flows off, the liquid gradually becoming clear. Already from the colour of the outflowing water it can be roughly ascertained when the neutralizing has reached the desired degree.

As soon as this stage has been reached, first the agitating device and then the water admission is stopped and the water contained in the vessel is drained away. The pin $o$ is then removed, the vessel $a$ is swung with the aid of the lever $d$ and it is fixed in the desired position by means of the screw $f$, in order to be able to take the goods out easily. After the vessel has been emptied, the shaft $i$ and the sieve bottom $u$ are taken out in order to be cleaned and are replaced before the commencement of the next working operation.

I claim as my invention:

1. An apparatus for neutralizing pickled nutriments and fodder, consisting of a cylindrical vessel, an agitating device arranged therein, means for supplying fresh water at the top of the vessel, a water outlet in the bottom of the vessel, a sieve above the main bottom of the vessel, means for swinging said vessel about a horizontal axis, and means for driving the agitating device.

2. An apparatus for neutralizing pickled nutriments and fodder, consisting of a cylindrical vessel including a bottom, an agitating device arranged in the vessel and including a shaft, means for admitting fresh water at the top of the vessel, a water outlet at the bottom of the vessel, a sieve above said bottom, and driving means for the agitating device detachably connected to said shaft, standards arranged adjacent the vessel, the vessel having journals supported in bearings in the standards, whereby to permit swinging of the vessel, and means for maintaining the vessel in adjusted swinging positions on said bearings.

3. An apparatus for neutralizing pickled nutriments and fodder, consisting of a cylindrical vessel, an agitating device arranged in the vessel, means for supplying fresh water at the top of the vessel, a water outlet in the bottom of the vessel, a removable sieve arranged at a distance from the main bottom of the vessel, said water outlet being arranged beneath the sieve, means whereby to swing said vessel about a horizontal axis, the agitating device including a shaft, means for driving the agitating shaft and having a movable coupling connection with the shaft, including a pin removably insertable between the shaft and an element of said driving means.

4. An apparatus for neutralizing pickled nutriments and fodder consisting of a cylindrical vessel, an agitating device arranged in the vessel, means for admitting fresh water at the top of the vessel, a water outlet in the bottom of the vessel, a removable sieve in the vessel, spaced from the bottom of the latter, means for swinging said vessel about a horizontal axis, a bracket above the vessel, means on the bracket for driving the agitating device and having movable and detachable connection with the agitating device.

5. An apparatus for neutralizing pickled nutriments and fodder consisting of a cylindrical vessel, an agitating device arranged in the vessel, means for admitting fresh water at the top of the vessel, a water outlet in the bottom of the vessel, a removable sieve in the vessel, spaced from the bottom of the latter, means for swinging said vessel about a horizontal axis, a bracket above the vessel, means on the bracket for driving the agitating device and having movable and detachable connection with the agitating device, a flexible siphon pipe having connection with the water outlet, and means for holding said pipe in adjusted positions.

6. An apparatus for neutralizing pickled nutriments and fodder, consisting of a supporting means, a vessel mounted on the supporting means for a swinging movement about a horizontal axis, an agitating device in the vessel including a shaft, a driving means for the agitator having an element movably and detachably connected to the shaft of the agitating device, means for supplying water at the top of the vessel, an outlet at the bottom of the vessel, and a siphoning pipe having connection with the water outlet.

7. An apparatus for neutralizing pickled nutriments and fodder, consisting of a supporting means, a vessel mounted on the supporting means for a swinging movement about a horizontal axis, an agitating device in the vessel including a shaft, a driving means for the agitator having an element movably and detachably connected to the shaft of the agitating device, means for supplying water at the top of the vessel, an outlet at the bottom of the vessel, a siphoning pipe having connection with the water outlet, means for holding the siphoning pipe in adjusted positions, a device arranged adjacent the vessel to swing the latter, and means for holding the vessel in various adjusted positions on its swinging axis.

8. An apparatus for neutralizing pickled nutriments and fodder, comprising a cylindrical vessel, an agitating device in the vessel, means for operating the agitating device, means for supplying fresh water at the top of the vessel, a water outlet in the bottom of the vessel, a sieve in the vessel above the vessel bottom, means whereby to rotate the vessel about a horizontal axis, and means to hold the vessel in adjusted positions.

In testimony whereof I have signed my name to this specification in the presence of two subscribing witnesses.

ROBERT SPEIDEL. [L. S.]

Witnesses:
BERT. A. BRAUN, [L. S.]
OTTO WAGNER. [L. S.]